US012252300B2

(12) United States Patent
Brauer

(10) Patent No.: US 12,252,300 B2
(45) Date of Patent: Mar. 18, 2025

(54) PACKAGING BAG AS WELL AS METHOD FOR PRODUCTION

(71) Applicant: Mondi AG, Vienna (AT)

(72) Inventor: Jochen Brauer, Lohne (DE)

(73) Assignee: Mondi AG, Vienna (AT)

( * ) Notice: Subject to any disclaimer, the term of this patent is extended or adjusted under 35 U.S.C. 154(b) by 0 days.

(21) Appl. No.: 17/726,714

(22) Filed: Apr. 22, 2022

(65) Prior Publication Data

US 2022/0340336 A1 Oct. 27, 2022

(30) Foreign Application Priority Data

Apr. 23, 2021 (EP) .................................... 21170166

(51) Int. Cl.

| | |
|---|---|
| ***B65D 30/08*** | (2006.01) |
| ***B31B 70/00*** | (2017.01) |
| ***B31B 70/62*** | (2017.01) |
| ***B31B 70/74*** | (2017.01) |
| ***B65D 30/18*** | (2006.01) |
| ***B65D 33/22*** | (2006.01) |
| *B31B 155/00* | (2017.01) |
| *B31B 170/20* | (2017.01) |

(52) U.S. Cl.

CPC ............ *B65D 31/02* (2013.01); *B31B 70/004* (2017.08); *B31B 70/62* (2017.08); *B31B 70/79* (2017.08); *B65D 31/08* (2013.01); *B65D 33/22* (2013.01); *B31B 2155/003* (2017.08); *B31B 2170/20* (2017.08)

(58) Field of Classification Search

CPC ......... B65D 31/02; B65D 31/08; B65D 33/22

USPC ......................................... 383/104, 124, 116

See application file for complete search history.

(56) References Cited

U.S. PATENT DOCUMENTS

| | | | | | |
|---|---|---|---|---|---|
| 904,167 | A * | 11/1908 | Widmer | B65D 31/00 | 493/218 |
| 904,169 | A * | 11/1908 | Widmer | B65D 31/00 | 493/243 |
| 2,051,903 | A * | 8/1936 | Royal | B65D 31/00 | 383/106 |
| 2,237,327 | A * | 4/1941 | Bell | B31B 70/00 | 383/122 |
| 4,491,217 | A | 1/1985 | Weder et al. | | |
| 5,195,829 | A * | 3/1993 | Watkins | B65D 81/3469 | 383/100 |

(Continued)

FOREIGN PATENT DOCUMENTS

| | | | | |
|---|---|---|---|---|
| EP | 1842784 A1 * | 10/2007 | | B65D 31/08 |
| EP | 2 845 820 A1 | 3/2015 | | |

(Continued)

OTHER PUBLICATIONS

Machine translation of JP-2015214673-A.*

(Continued)

*Primary Examiner* — Jes F Pascua

(74) *Attorney, Agent, or Firm* — Collard & Roe, P.C.

(57) ABSTRACT

A packaging bag has a bag body formed from a flat web and has a first front wall and a second front wall as well as a stand-up bottom formed in a bottom section by folding and gluing the front walls. The flat web has a varnish coating on an outside of the bag body, wherein the first front wall has an adhesive region free of the varnish coating in the bottom section of the bag body.

17 Claims, 6 Drawing Sheets

(56) References Cited

U.S. PATENT DOCUMENTS

2015/0078684 A1 3/2015 Koesters et al.

FOREIGN PATENT DOCUMENTS

GB 1579832 A * 11/1980 ............ A24F 23/02
JP 2015214673 A * 12/2015 ............ B32B 27/30

OTHER PUBLICATIONS

European Search Report dated Sep. 23, 2021 in European Application No. 21 170 166.9 with an English translation of the relevant parts.
DIN 67 530, Jan. 1982, total of 5 pages. (see specification for relevance).

* cited by examiner

PACKAGING BAG AS WELL AS METHOD FOR PRODUCTION

CROSS REFERENCE TO RELATED APPLICATIONS

Applicant claims priority under 35 U.S.C. § 119 of European Application No. 21 170 166.9 filed Apr. 23, 2021, the disclosure of which is incorporated by reference.

BACKGROUND OF THE INVENTION

1. Field of the Invention

The present invention relates to a packaging bag having a bag body formed from a flat web, which body has a first and second front wall as well as a stand-up bottom formed in a bottom section by means of folding the front walls over and gluing them together.

In this connection, the region of the bag body that corresponds, in the filled state, to an essentially horizontal, cuboid surface, by way of which the bag can be stood up, is referred to as a bottom section. Therefore, the bottom section is barely visible from the outside or is perceived by a consumer only in a very restricted manner.

Within the scope of the invention, the term “flat web” relates to thin, planar materials without reference to a specific material. Thus, the flat web can be formed from plastic or also from paper. Furthermore, combinations of these materials are also included. Thus, for example, a flat web of paper can have one or more coatings, for example sealing coatings. Sealing coatings are coatings of a sealing varnish or a hot glue.

2. Description of the Related Art

Such packaging bags are fundamentally known from the prior art. Thus, for example, EP 2 845 820 A1 describes a side-fold bag composed of a plastic bonded fabric, wherein the side-fold bag is closed off, at one end, in that a section of the front wall as well as side-fold sections that are arranged between the section of the front wall and the rear wall are folded onto the rear wall, forming a bottom fold, and connected with this wall.

After the stand-up bottom is formed, the packaging bag is closed off at a lower edge, wherein usually the front walls are already sealed to one another or to sections of the side folds even before a lower bag edge is folded over. Filling can then take place by way of the upper edge of the packaging bag. After being filled, the packaging bag is then closed off at the upper edge by means of heat-sealing. Alternatively, instead of heat-sealing, gluing can also take place. This gluing can be necessary if at least the layers of the flat web that lie on the inside are not configured to be heat-sealable.

A bottom fold is formed for the stand-up bottom, which fold is of essential significance for the stability of the stand-up bottom, so that the packaging bag can be stood up in its filled state. At the same time, however, an effort is also made to structure such packaging bags to be as optically appealing and as high-quality as possible, so that coatings that influence the optical appearance or also protect the flat web toward the outside are increasingly in use. This use is particularly the case if the flat web has an imprinting. By means of using what is called a protective varnish, the imprinting can be enclosed, and it is thereby better protected against external influences. In particular in the case of a flat web made of paper, such a coating is particularly advantageous. Furthermore, in the case of a flat web made of paper, a certain degree of gloss can also be produced by means of the coating.

Such coatings, however, frequently lead to the result that gluing of the bottom fold is not sufficiently stable and leads to separation of the same. This separation is particularly problematic if a matte varnish is used as the coating, which varnish imparts a surface structure to the flat web that is used, which structure has a particularly disadvantageous effect on the bond strength.

SUMMARY OF THE INVENTION

Against this background, the present invention is based on the task of indicating a packaging bag that has better and more durable stability of the stand-up bottom as compared with known packaging bags, while the packaging bag is characterized, at the same time, by an optically high-quality appearance.

This task is accomplished by means of a packaging bag in accordance with one aspect of the invention.

Accordingly, it is provided, according to the invention, that the flat web has a varnish coating on an outside of the bag body, wherein the first front wall, in the bottom section of the bag body, has an adhesive region provided for forming the stand-up bottom, which region is free of the varnish coating. In this connection, an outside of the bag body means a side that faces the outer surroundings of the packaging body. In contrast, an inside of the bag body relates to the side that faces the packaged goods.

According to the invention, it is therefore provided that only there does the packaging bag have a coating that is decisive for the entire optical appearance, on the one hand, and, at the same time, is not intended for forming the bottom fold. Such an embodiment therefore presupposes that the flat web already has to be structured before production of the actual packaging bag, in such a manner that the regions that are supposed to form the bottom fold during the course of production of the packaging bag are kept free of the actual coating. As a result, these sections demonstrate clearly better adhesion with regard to an adhesive seam. Opening up the bottom fold is thereby clearly more difficult and more rarely possible.

At the same time, the stand-up bottom of the packaging bag is not noticed or hardly noticed by the user, so that this region is of only subordinate importance for the optical appearance. In this regard, it should also be noted that the adhesive region relates to the region of the first front wall, which is laid onto itself during the course of folding, so that the regions without a varnish coating are no longer visible from the outside after being folded and glued. In contrast to the first front wall, the second front wall is completely provided with a varnish coating, wherein regions of the second front wall cover the adhesive region after folding, so that accordingly, the varnish-free regions would be visible to the user only if the adhesive seam in the bottom fold were broken up.

According to a further development of the invention, the front walls are folded over in such a manner, so as to form the stand-up bottom, that sections of the adhesive regions of the first front wall lie on top of one another. Therefore, gluing takes place on only the first front wall. As the result of folding the front walls over, a lower edge is formed, which edge represents the lower end of the bag body and is arranged within the adhesive region. Such a view relates to an unfilled state of the bag body, in which the stand-up bottom itself is not fully formed.

Proceeding from such a flat state of the bag body, the sections of the first front wall that lie on top of one another extend, according to a preferred further development of the packaging bag, proceeding from the lower edge, in the vertical direction, up to a distance from a lower bag edge, wherein the lower bag edge relates to the cut edge or represents the lower end of the bag body, before the front walls were folded over to form the stand-up bottom. Accordingly, the two front walls lie opposite one another up to the bag edge, wherein subsequently, the bag edge is folded upward in the vertical direction by means of forming the bottom fold. In this connection, the vertical direction relates to the bag height, wherein the bag body extends, in the flat state, between an upper edge and a lower edge, in the vertical direction. Preferably the distance between the lower bag edge and the adhesive region lies between 3 mm and 10 mm, for example 5 mm.

According to a further development of the invention, an adhesive strip that extends in the transverse direction of the bag body is arranged in the adhesive region on the first front wall, in order to glue the stand-up bottom. As a result, within the scope of the invention, the adhesive strip extends in the form of an elongated structure in the adhesive region. Preferably the adhesive strip is applied in caterpillar form. In other words, the adhesive is applied along the transverse direction, while simultaneously being swirled up in spiral form. In this regard, attention must be paid to ensure that in the case of a hot-melt adhesive, no heating of the flat web takes place that would cause possible inner layers to be bonded to one another. Against this background, the amount of the material application and thereby also the adhesive strength are limited. At the same time, rapid cooling and hardening also occur.

To glue the stand-up bottom or the bottom fold, an adhesive is provided, which is preferably a hot-melt adhesive, which is also referred to, in general, as a hot-melt.

These hot-melt adhesives are adhesives that are based on thermoplastic polymers and can be transformed to a hot-melt state under the effect of heat. Then application to the first front wall is possible. After this adhesive solidifies, an adhesive effect occurs, so that as a result, the sections of the first front wall, which form the adhesive region, are laid on top of one another by being folded over, and can be connected with one another by means of solidification of the hot-melt adhesive. Of course, however, other types of adhesives are also suitable for the packaging bag according to the invention. For example, solvent-based or water-based adhesives can also be used, wherein then the adhesive effect is brought about by means of drying of the adhesive. Preferably, however, a hot-melt adhesive, particularly on the basis of ethylene/vinyl acetate copolymers (EVA) is used.

As has already been mentioned initially, particularly in the case of varnish coatings with a matte varnish, the adhesion problem is of particular importance because of the rough surface. It is possible, however, to bring about a particularly high-quality appearance using such matte varnishes. According to a preferred embodiment of the invention, the varnish coating of matte varnish brings about the result that the flat web has a gloss level of less than 70 gloss units (GU) in the regions that have the varnish coatings, preferably less than 50 GU, measured according to DIN 67530 at a light incidence angle of 60°. This measurement unit is based on a reference value that is achieved with a polished, black glass standard with a defined index of refraction. The maximum reference value is established at 100 GU. The lower reference point lies at 0 GU, which corresponds to a measured value that is achieved in the case of a perfectly matte surface. To determine the degree of gloss, the intensity of a directed reflected beam of light is measured at a defined angle about the reflection angle, and afterwards brought into relation with the reflection properties of the black, polished glass standard that has an established refractive index.

Because, according to the invention, the matte varnish is provided in only the regions outside of the adhesive region, the flat web can have a surface, in the adhesive region, that preferably has a degree of gloss of more than 70 GU, preferably more than 80 GU, particularly preferably more than 90 GU, measured according to DIN 67530 at a light incidence angle of 60°. In this regard, the degree of gloss is based, in particular, on the type of material used, which is used for the flat web or, in the case of a multi-layer embodiment, for the layer that borders on the varnish coating.

According to a preferred embodiment, the flat web is configured in multiple layers and has a layer of a material selected from the group of polyethylene (PE), polyethylene terephthalate (PET), polypropylene (PP), polylactide (PLA), and paper, which layer borders on the varnish coating. Polyethylene terephthalate and polylactide, in particular, have high polarity and can therefore be glued particularly well on the basis of their chemical structure. Furthermore, the film layers can also be monoaxially oriented, for example in the machine direction, or biaxially oriented. Oriented films generally have a very smooth surface. This smooth surface also leads to a particularly good adhesive effect of the adhesive.

Proceeding from a multi-layer embodiment of the invention, the innermost layer or the layer that forms the inside of the bag body is formed from a heat-sealable material, for example polyethylene, so that the individual front walls or, if applicable, also further components of the bag body can be connected with one another by means of heat-sealing. In particular, the upper edge can be closed off by means of heat-sealing after the filling process.

Fundamentally it is sufficient for the invention if only two front walls are connected with one another, wherein, however, side folds are preferably provided for more stable standing and for a larger fill volume, which folds are arranged between the front walls, and wherein sections of the side folds are folded over in the bottom section to form the stand-up bottom. The side folds therefore preferably extend into the bottom region of the bag body, so that the front walls are connected with one another in the bottom region, at the lateral ends, by way of the side folds, in particular by means of heat-sealing. At the same time, this arrangement also means that these sections that lie in the bottom region also become part of the bottom fold, so that correspondingly more film material is provided in the lateral sections of the side folds. Because of the resetting effect of the material, it is therefore particularly important, specifically in the case of an embodiment in the form of a side-fold bag, that the adhesive has a sufficient adhesive effect. In this regard, it must also be taken into consideration that the bag contents, for example animal feed, press the bottom fold apart, so that the forces that must be absorbed by the bottom fold must be absorbed to a sufficient degree.

In order to increase the adhesive effect of the adhesive, a corona treatment, for example, can supplementally be provided in the adhesive region. A corona treatment is understood to be an electrochemical method for surface modification of plastics, thereby increasing the polarity.

Preferably the adhesive region of the first front wall is at a greater distance from the lateral edges of the bag body. The distance preferably amounts to between 10 and 20 mm, particularly preferably between 12 mm and 18 mm, for example 15 mm.

The packaging bag can furthermore be provided with resealable closures arranged in the bag body, wherein these resealable closures are then preferably arranged in the upper region, i.e. in the head region of the bag body. These resealable closures are provided for the purpose of being able to close the bag body again after it has been opened for the first time. Furthermore, a perforation or a weakening line can be provided in the flat web for first-time opening, which allows the bag body to be torn open and, at the same time, a chute is formed, through which the material can be taken out of the bag body. Correspondingly, the resealable closure is then configured in such a manner that this chute can be sealed again, for example by pressing the two front walls together.

The packaging bag that has been described can fundamentally be used for packaging a great number of packaged goods, wherein, however, packaged goods in piece form or granular form are preferably used. These goods can be, for example, foods, animal feeds, or also animal bedding.

Furthermore, a method for production of a packaging bag according to the invention, in accordance with another aspect of the invention, is an object of the invention, wherein

- a flat web is supplied in the machine direction (MD), which web has two regions arranged next to one another, forming the front walls, and wherein the flat web is provided with a coating on a first side, wherein an adhesive region of the region that forms the first front wall is free of a coating,
- wherein a film tube is formed from the flat web, by means of folding and heat-sealing, in such a manner that the front walls lie on top of one another, at least in certain sections,
- wherein individual bag bodies are cut from the film tube,
- wherein a stand-up bottom is formed by means of folding over a lower edge, in such a manner that sections of the adhesive region of the first front wall lie on top of one another, and
- wherein the sections that lie on top of one another are glued to one another.

Preferably, it is provided that in order to glue together the sections that lie on top of one another, an adhesive, preferably a hot-melt adhesive, is applied to the first front wall, in the adhesive region, before this region is folded over. In this regard, application of the adhesive takes place in strip shape, in accordance with a preferred embodiment, in particular with a caterpillar-like structure.

According to a further development of the method according to the invention, side walls arranged between the front walls are formed by means of folding over the flat web, which folds connect the regions that are arranged next to one another and form the front walls.

Fundamentally, the adhesive region can extend all the way to a lower bag edge. It is preferably provided, however, that the adhesive region is at a distance from the lower bag edge after the bag body is cut off, wherein the distance particularly amounts to between 3 mm and 10 mm, for example 5 mm.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
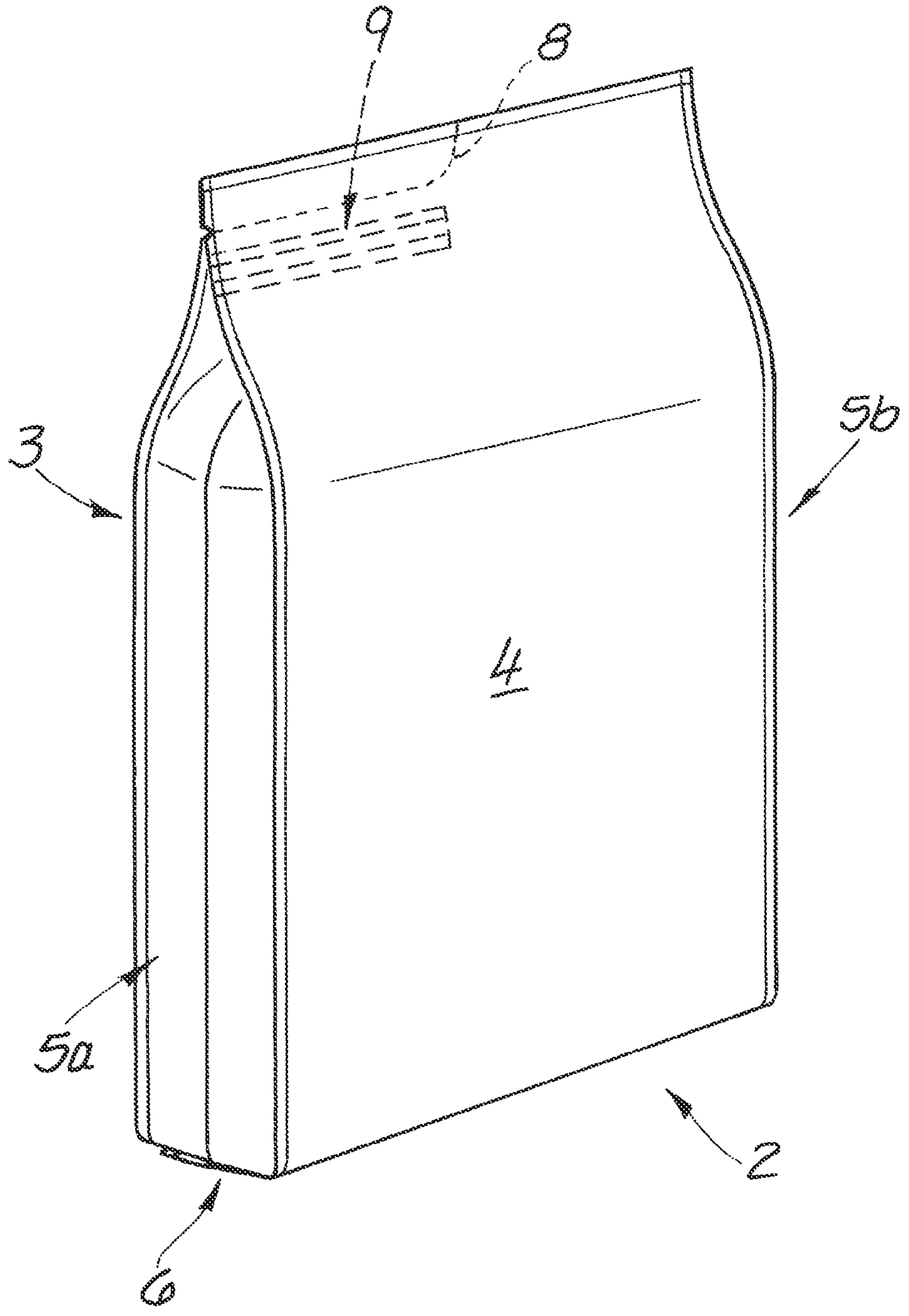
FIG. 1 shows a packaging bag according to the invention.

FIG. 1 shows a packaging bag according to the invention, having a bag body 2 formed from a flat web 1 (see FIG. 2), wherein the bag body 2 is formed from a first and second front wall 3, 4 as well as side folds 5*a*, 5*b* that are arranged between them. Furthermore, the bag body 2 has a stand-up bottom 6 in a bottom section, which bottom is formed by means of folding over and gluing together the front walls 3, 4, and this bottom 6 accordingly has a bottom fold 7 (see FIG. 6).

Furthermore, a perforation 8 is provided in a head region arranged at the upper end, by way of which perforation the bag body 2 can be opened by means of tearing open the flat web 1. For renewed closing, a resealable closure 9 is furthermore provided, which closes the bag body 2 off again by means of pressing the front walls 3, 4 together.

For the invention, the embodiment of the stand-up bottom 6 with the bottom fold 7 is of particular importance. The embodiment and formation of the stand-up bottom 6 in this regard can be explained particularly clearly and in greater detail using the production of the packaging body.

Figure 2:
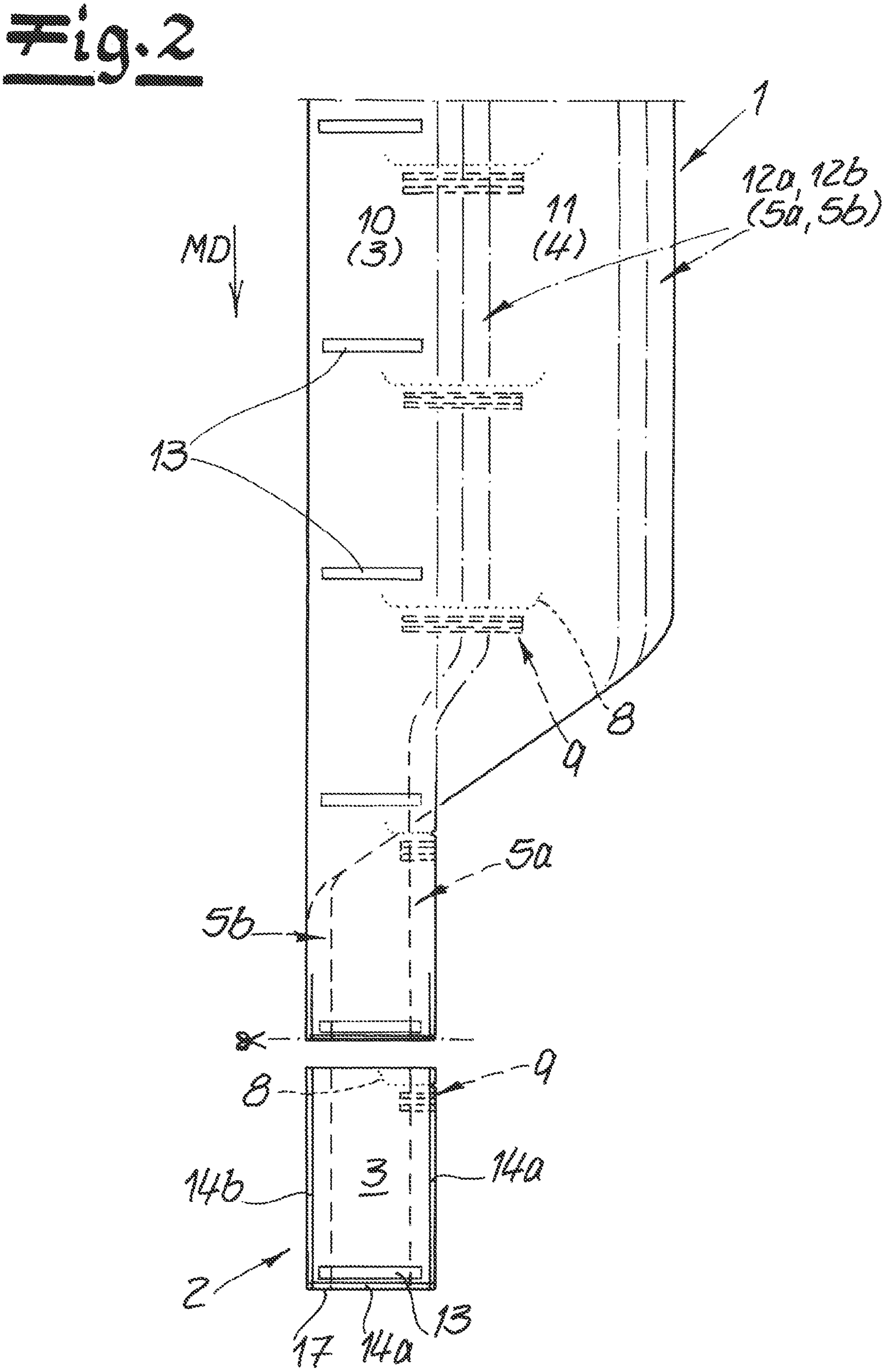
FIGS. 2 to 6 show method steps for the production of the packaging bag shown in FIG. 1.

In this regard, FIG. 2 shows the flat web 1, which is supplied in the machine direction MD. The flat web 1 is configured in such a manner that regions 10, 11 are provided, which will later form the front walls 3, 4. Furthermore, regions 12*a*, 12*b* are provided, which will form the side folds 5*a*, 5*b* by means of folding the flat web 1 over.

Figure 3:
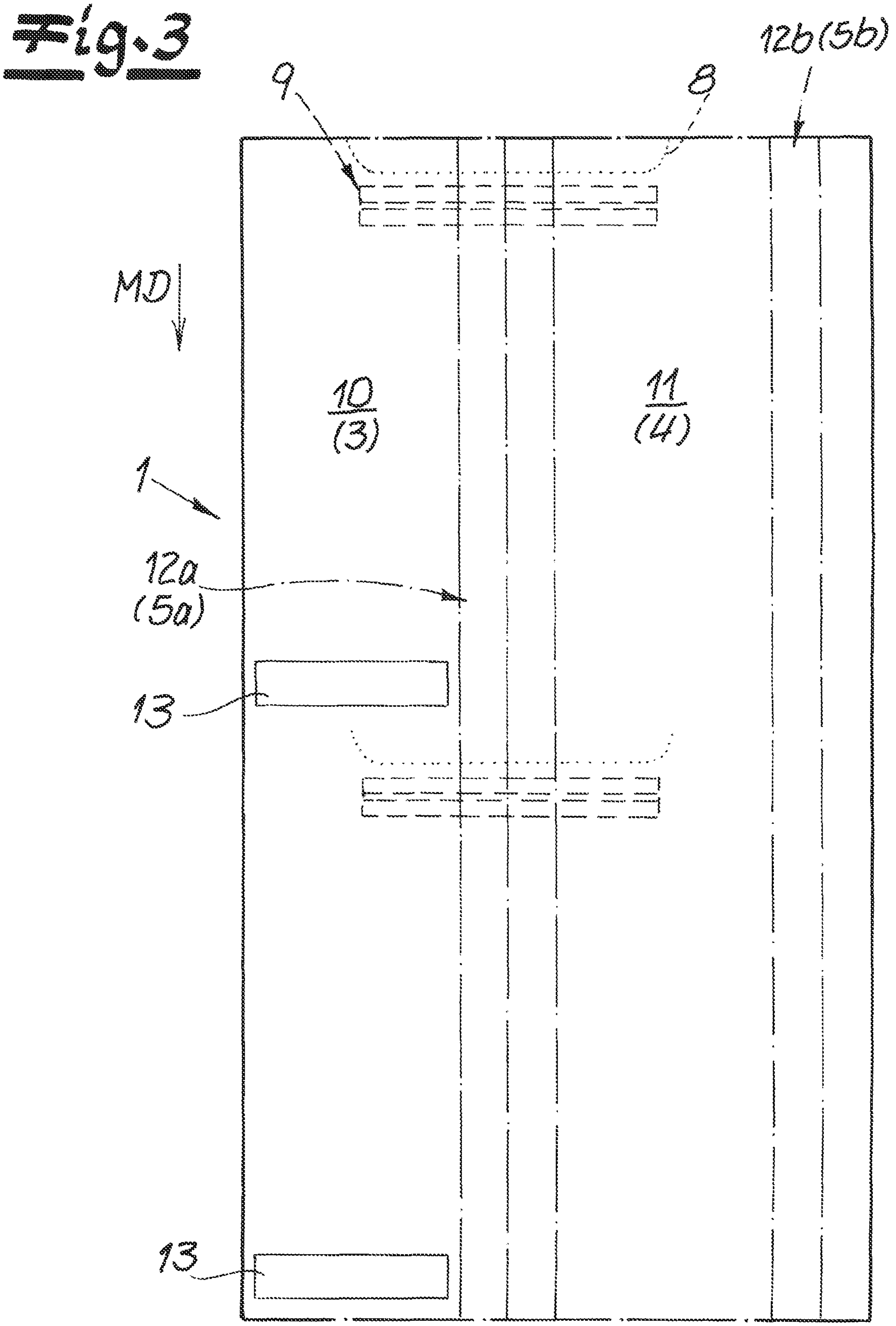

The flat web 1 is configured in multiple layers and has a layer of polyethylene that forms the inside, and a layer of polyethylene terephthalate that forms the outside. In order to be able to impart an optically high-quality appearance to the packaging bag after production, the flat web 1 has a coating composed of a matte varnish on the side that forms the outside of the packaging bag, i.e. on the layer of PET. Such a matte varnish, however, has the disadvantage that it has a detrimental effect on the adhesive effect of an adhesive, in particular of a hot-melt adhesive. Against this background, an adhesive region 13, which is configured to be free of a coating with matte varnish, is provided in the region 10 of the flat web 1. In this connection, the region 10 represents the region of the flat web 1 that will later form the first front wall 3. In this connection, reference is made to FIG. 3 for a better representation; it shows the film web in an enlarged manner of representation.

Then a perforation 8 can also be introduced into the flat web 1, and a resealable closure 9 can be attached.

Figure 4:
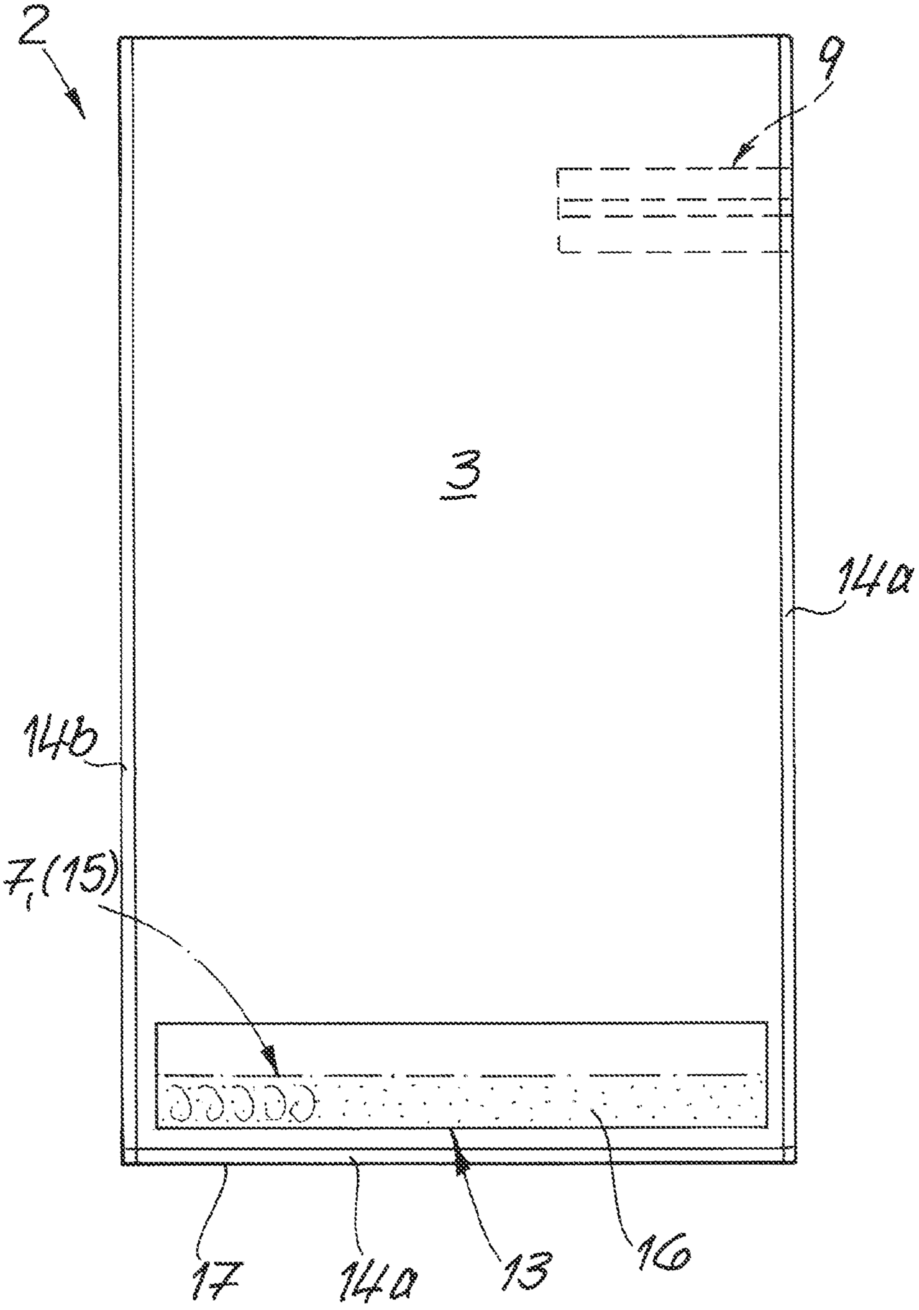
Figure 5:
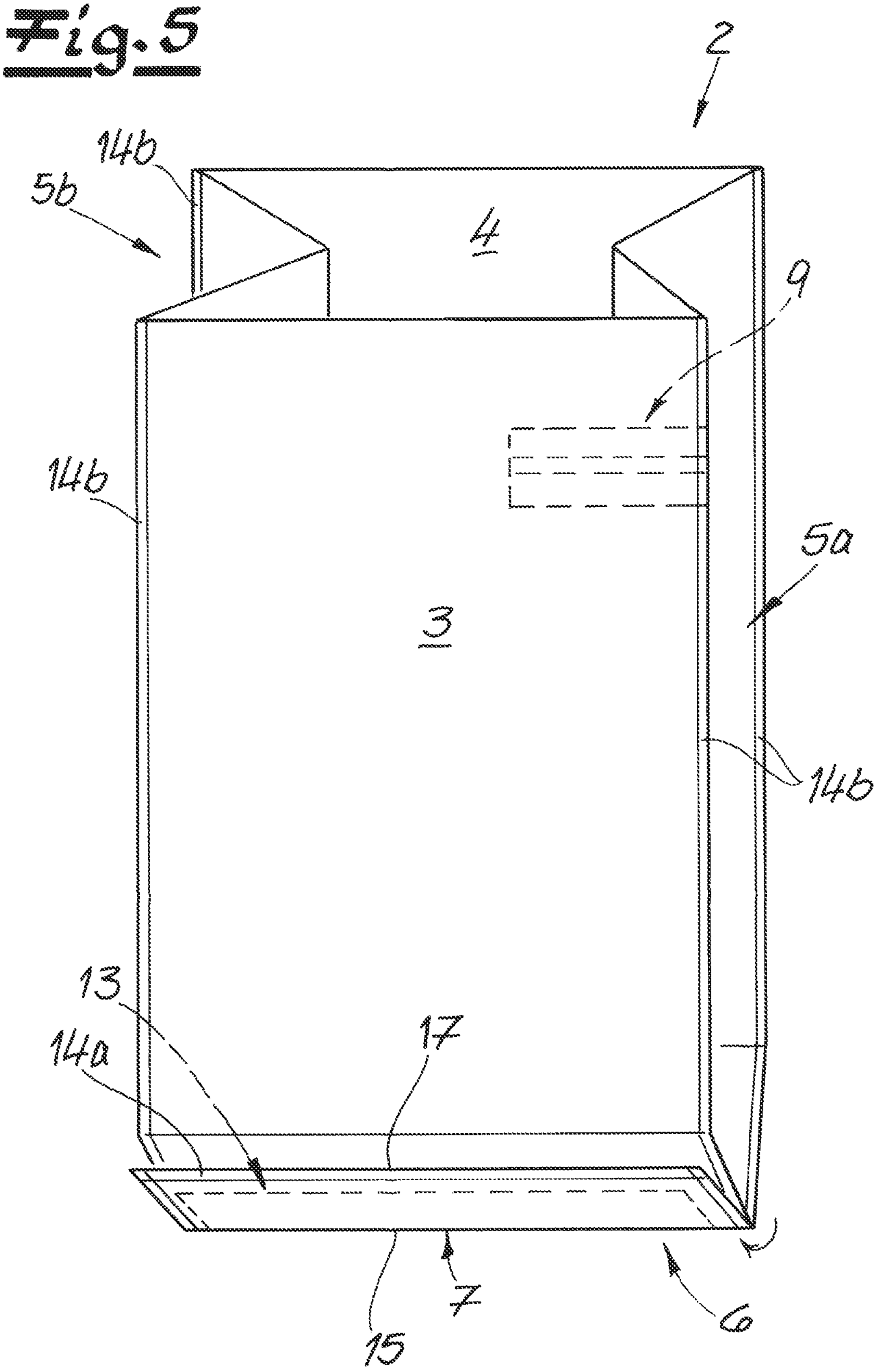
Figure 6:
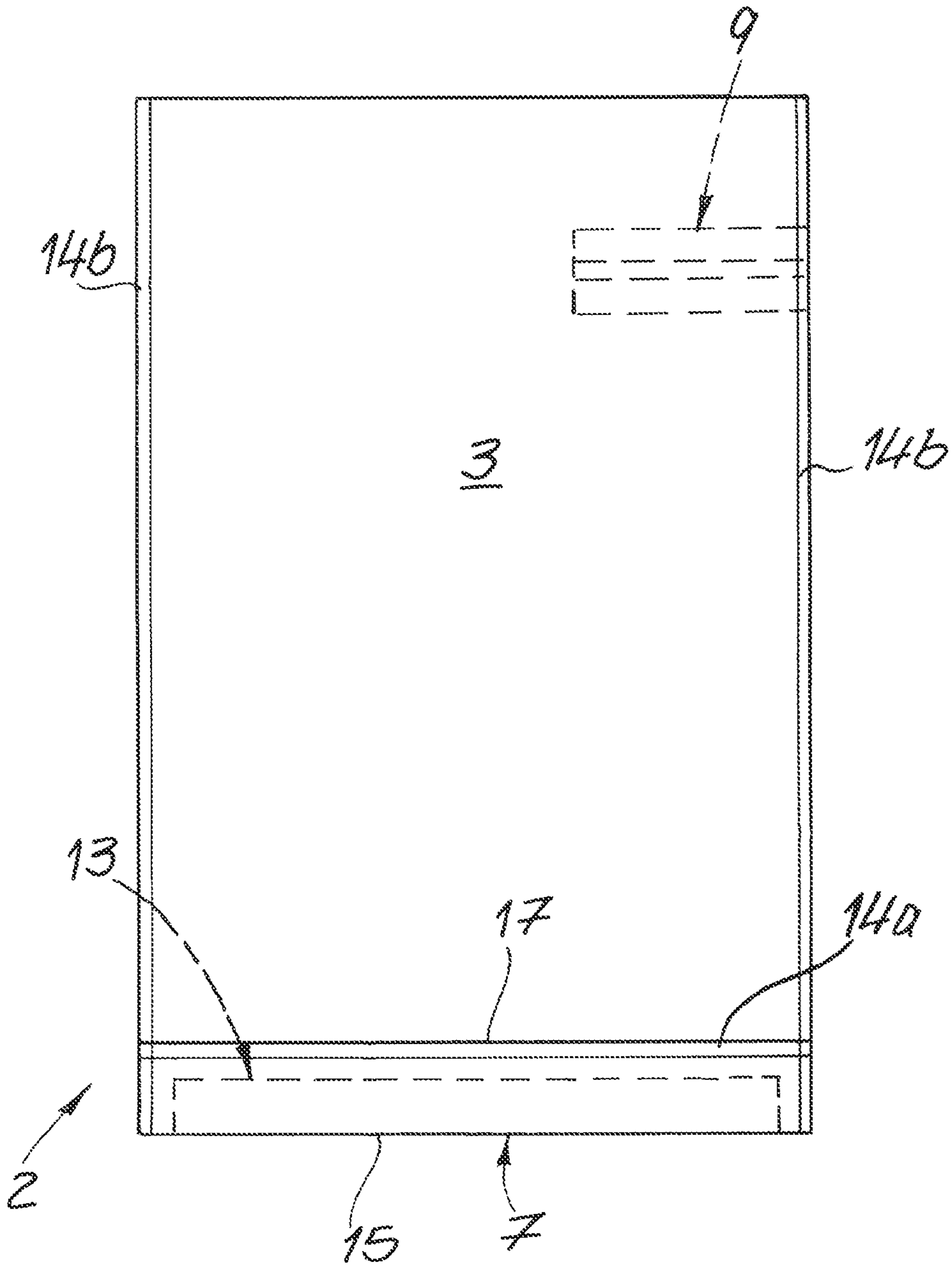

The configuration of the stand-up bottom 6 is shown in greater detail in FIG. 4 to FIG. 6. FIG. 4 shows the bag body 2, cut off from the film tube, in a view in which the frontmost front wall 3 represents the front side of the bag body 2. By way of a heat-sealing seam 14*a*, the bag body 2 was closed off at a lower end, and the front walls 3, 4 were connected either directly with one another or by way of regions of the side folds 5*a*, 5*b*. Furthermore, heat-sealing seams 14*b* are also provided, which stabilize the side folds 5*a*, 5*b*.

In the embodiment shown in FIG. 4, the stand-up bottom 6 was not yet formed, so that accordingly, a bottom fold 7 has not yet been provided. FIG. 4 does show, however, the lower edge 15 of the bag body, which was formed by folding over the lower region of the bag body 2. This formation also means, at the same time, that sections of the adhesive region 13 lie against one another after being folded over.

An adhesive strip 16 is provided in the adhesive region 13, which strip is configured in caterpillar form and fixes the bottom fold 7 in place after it has been folded over, in that the sections of the adhesive region 13 are fastened onto one another. Then the actual folding over to form the bottom fold 7 takes place in FIG. 5.

The finished packaging bag is then shown in a flat-laid state in FIG. 6. Accordingly, the adhesive region 13 extends all the way to the lower edge 15 of the bag body 2. In the example shown, the distance from the lower bag edge 17 is 5 mm, and from the lateral edges it is 15 mm.

Although only a few embodiments of the present invention have been shown and described, it is to be understood that many changes and modifications may be made thereunto without departing from the spirit and scope of the invention.

What is claimed is:

1. A packaging bag having a bag body formed from a flat web, the bag comprising:

a first front wall;

a second front wall;

a heat-sealed seam that closes the bag body at a lower end by connecting the first front wall and the second front wall either directly or via side folds; and a stand-up bottom formed in a bottom section of the bag body by folding and gluing the first and second front walls;

wherein the flat web has a varnish coating on an outside of the bag body;

wherein the first front wall has an adhesive region kept free of the varnish coating in the bottom section of the bag body; and wherein the flat web comprises a layer of a material selected from the group of polyethylene (PE), polyethylene terephthalate (PET), polypropylene (PP), polylactide (PLA), and paper that borders on the varnish coating, the varnish coating being in contact with the layer of material, wherein to form the stand-up bottom, the front walls are folded over so that sections of the adhesive region of the first front wall lie on top of one another.

2. The packaging bag according to claim 1, wherein the sections of the first front wall that lie on top of one another extend, in an unfilled, flat state of the bag body, proceeding from a lower edge, in a vertical direction, up to a distance from a lower bag edge.

3. The packaging bag according to claim 2, wherein the distance amounts to between 3 mm and 10 mm.

4. The packaging bag according to claim 1, wherein an adhesive strip that extends in a transverse direction of the bag body is arranged in the adhesive region on the first front wall, in order to glue the stand-up bottom.

5. The packaging bag according to claim 1, wherein a hot-melt adhesive is used as an adhesive.

6. The packaging bag according to claim 1, wherein the varnish coating is a matte varnish; and wherein the flat web has a gloss level of less than 70 GU (gloss units) measured according to DIN 67530 at a light incidence angle of 60° in regions on the outside that have the varnish coating.

7. The packaging bag according to claim 6, wherein the flat web has a gloss level of less than 50 GU (gloss units) measured according to DIN 67530 at the light incidence angle of 60° in the regions.

8. The packaging bag according to claim 1, wherein the flat web is configured in multiple layers.

9. The packaging bag according to claim 1, wherein the bag body has first and second side folds arranged between the first and second front walls; and wherein sections of the first and second side folds are folded over in the bottom section to form the stand-up bottom.

10. The packaging bag according to claim 1, wherein the adhesive region of the first front wall is at a distance from lateral edges of the bag body.

11. The packaging bag according to claim 1, wherein the adhesive region is pre-treated using a corona method.

12. A method for production of the packaging bag according to claim 1, the method comprising:

supplying a flat web in a machine direction, wherein the flat web has first and second regions arranged next to one another, forming the first and second front walls, respectively, wherein the flat web is provided with a coating on a first side, and wherein an adhesive region of the first region that forms the first front wall is free of a coating;

forming a film tube from the flat web, by folding and heat-sealing, so that at least certain sections of the first and second front walls lie on top of one another;

cutting individual bag bodies from the film tube;

forming a stand-up bottom by folding over the bag body in a lower region of the bag body so that sections of the adhesive region of the first front wall lie on top of one another; and gluing to one another the sections that lie on top of one another.

13. The method according to claim 12, wherein side folds arranged between the first and second front walls are formed by folding the flat web.

14. The method according to claim 12, wherein an adhesive is applied to the first front wall in the adhesive region before forming the stand-up bottom.

15. The method according to claim 14, wherein the adhesive is a hot-melt adhesive.

16. The method according to claim 14, wherein the adhesive is arranged in strip form.

17. The method according to claim 12, wherein the adhesive region is at a distance from a lower bag edge after the bag body has been cut off.

* * * * *